US012593822B1

(12) United States Patent

Matteson et al.

(10) Patent No.: US 12,593,822 B1

(45) Date of Patent: Apr. 7, 2026

(54) ANIMAL ENCLOSURE ASSEMBLY FOR DRYING AN ANIMAL

(71) Applicant: MIDMARK CORPORATION, Versailles, OH (US)

(72) Inventors: Michael L. Matteson, Kansas City, KS (US); Robert P. Eckwall, Kansas City, MO (US); Joseph Anthony Schroer, Leawood, KS (US)

(73) Assignee: Midmark Corporation, Versailles, OH (US)

( * ) Notice: Subject to any disclaimer, the term of this patent is extended or adjusted under 35 U.S.C. 154(b) by 1010 days.

(21) Appl. No.: 17/712,394

(22) Filed: Apr. 4, 2022

Related U.S. Application Data

(60) Provisional application No. 63/175,097, filed on Apr. 15, 2021.

(51) Int. Cl.
A01K 13/00 (2006.01)
F26B 25/12 (2006.01)

(52) U.S. Cl.
CPC ............ A01K 13/001 (2013.01); F26B 25/12 (2013.01)

(58) Field of Classification Search
CPC .............................. A01K 13/001; F26B 25/12
See application file for complete search history.

(56) References Cited

U.S. PATENT DOCUMENTS

| | | | | | |
|---|---|---|---|---|---|
| 4,314,410 | A | * | 2/1982 | Nichols ................ | A01K 13/001 34/233 |
| 4,559,903 | A | * | 12/1985 | Bloom ................. | A01K 13/001 219/400 |
| 6,058,886 | A | | 5/2000 | Haines | |
| 11,533,889 | B1 | * | 12/2022 | Arora .................... | A01K 1/0157 |
| 2017/0099805 | A1 | * | 4/2017 | Arab ...................... | A01K 1/035 |
| 2020/0029530 | A1 | * | 1/2020 | Yoon ...................... | F26B 21/00 |
| 2020/0100464 | A1 | * | 4/2020 | Kim ...................... | A01K 13/001 |
| 2020/0113153 | A1 | * | 4/2020 | Yoo ...................... | A01K 1/0076 |
| 2021/0243999 | A1 | * | 8/2021 | Park .................... | A01K 13/001 |
| 2023/0240262 | A1 | * | 8/2023 | Liu ...................... | A01K 13/001 119/673 |

FOREIGN PATENT DOCUMENTS

| | | | | |
|---|---|---|---|---|
| KR | 200475300 Y1 | * | 11/2014 | ........... A01K 13/001 |

OTHER PUBLICATIONS

Machine Translation of KR-200475300-Y1, Nov. 21, 2014 (Year: 2014).*

* cited by examiner

*Primary Examiner* — Kimberly S Berona
*Assistant Examiner* — Katherine June Walter
(74) *Attorney, Agent, or Firm* — FBT Gibbons LLP

(57) ABSTRACT

An animal enclosure assembly having an enclosure with at least one side wall and a bottom wall coupled to the side wall. The bottom wall and the side wall define an interior space for containing an animal. The enclosure defines an air outlet that is positioned adjacent a top of the side wall, and an air inlet positioned below the air outlet. The air inlet is configured to receive airflow such that the airflow is directed transversely across the interior space toward a portion of the side wall in a first direction. The airflow is redirected by the portion of the side wall across the interior space in a second direction that is positioned at an angle with respect to the first direction.

17 Claims, 13 Drawing Sheets

ANIMAL ENCLOSURE ASSEMBLY FOR DRYING AN ANIMAL

CROSS-REFERENCE TO RELATED APPLICATIONS

This application is based on and claims priority to U.S. Provisional Application Ser. No. 63/175,097, filed on Apr. 15, 2021, which is incorporated herein by reference in its entirety.

BACKGROUND OF THE INVENTION

1. Field of the Invention

The invention generally relates to drying animals and, in particular, to an enclosure assembly that is configured for drying the wet coat of an animal housed within the enclosure.

2. Description of Related Art

Many types and breeds of pet animals, such as dogs and cats, require periodic grooming of the hair on the pet's coat to present a clean and well-groomed appearance. The process of grooming the pet typically includes the steps of shampooing the pet's coat, drying the pet's coat, trimming the hair of the pet's coat (if desired), and combing the loose hair from the pet's coat. In an effort to decrease the amount of time required to groom the pet, it is known to use a variety of different types of electric dryers to perform the step of drying the pet's coat.

For example, some groomers have been known to use a hand-held hair dryer (such as those commonly sold for use by people) to dry the pet's coat. Another type of manual dryer consists of a base unit having a flexible tube extending therefrom, wherein the base unit can be mounted on a grooming table, mounted on a wall near a grooming table, placed on the floor near a grooming table, or mounted on wheels so that the dryer can be pulled between grooming stations. Within the base unit is a motor-powered squirrel cage blower which operatively forces air through the flexible tube.

To use the above dryers, the groomer aims the hair dryer or flexible tube at a particular area of the pet's coat and dries that area, aims the hair dryer or flexible tube at a different area of the pet's coat and dries that area, and so on. The disadvantage of using these type of dryers is that the groomer must manually dry the pet's coat, thereby preventing him/her from performing other tasks during the drying process.

Therefore, to enable a groomer to perform other tasks during the drying process, various types of "cage" dryers have been designed which allow the groomer to place a shampooed pet inside a cage to dry the pet's coat.

For example, the base unit/flexible tube dryer described above is designed to optionally include a cage attachment which can be secured to the end of the flexible tube. In use, a shampooed pet is placed inside a cage, the end of the flexible tube is attached to the wire cage door, and the blower forces air through the tube and into the cage at a volumetric rate ranging from 100 to 300 cubic feet per minute.

Another type of cage dryer is a stand dryer. A stand dryer consists of a housing mounted on a vertical pole, wherein the pole is supported by a base mounted on wheels so that the dryer can be rolled between cages. Within the housing is a motor-powered squirrel cage blower which operatively forces air through a drying nozzle of the housing. In use, a shampooed pet is placed inside a cage, the stand dryer is positioned next to the wire cage door, and the blower forces air through the drying nozzle and into the cage at a volumetric rate ranging from 100 to 300 cubic feet per minute.

Yet another type of cage dryer is a hanging dryer. A hanging dryer consists of a housing having hooks attached thereto such that the dryer can be hung from the wire door of a cage. Within the housing is a motor-powered squirrel cage blower which operatively forces heated air through a rectangular vent on the front of the dryer. In use, a shampooed pet is placed inside a cage, the hanging dryer is hung on the wire cage door, and the blower forces heated air through the vent and into the cage at a volumetric rate ranging from 150 to 550 cubic feet per minute.

The disadvantage of using the above cage dryers is that the relatively small area of the dryer opening only directs enough air into the cage to dry a portion of the surface of the pet's coat at a time. Thus, the groomer may have to reposition the dryer in relation to the pet throughout the drying process, thereby requiring some manual intervention on the part of the groomer. In addition, some regions of the pet's coat (e.g. the side facing away from the dryer) will not be as dry as others. Furthermore, it is well known that pet animals left unattended in a heated cage can develop hyperthermia (fatal overheating) and/or suffer dehydration as a result of the heat. Therefore, many groomers refuse to use heated cage dryers because of the potential health hazards to the pet.

In yet a further attempt to dry a pet animal, cage dryers have been designed which consist of a substantially enclosed cage having a motor-powered squirrel cage blower housed within a compartment inside the cage. In use, the blower circulates jets of heated air under the cage flooring and into the cage at a volumetric rate ranging from 500 to 1400 cubic feet per minute. The disadvantage of using these cage dryers is that they use heated air to dry the pet's coat. Therefore, many groomers also refuse to use these cage dryers because of the potential health hazards to the pet.

An additional type of pet cage dryer, as described in U.S. Pat. No. 6,058,886, includes a cage with at least one fan assembly that forms a side wall of the cage. The fan assembly blows unheated air across substantially the entire interior region of the cage to dry an animal positioned in the cage. While this type of pet cage dryer is generally suitable for its intended purpose, if the animal is leaning against a wall of the cage, sitting on the floor of the cage, or laying down on the floor of the cage, portions of the animal's fur in contact with the wall or floor may not be sufficiently dried by the air from the fan that is blown across the cage.

BRIEF SUMMARY OF THE INVENTION

An animal enclosure assembly for drying an animal in accordance with one embodiment of the invention described herein includes an enclosure having at least one side wall and a bottom wall coupled to the side wall. The bottom wall and the side wall define an interior space for containing an animal. The enclosure defines an air outlet that is positioned adjacent a top of the side wall, and an air inlet positioned below the air outlet. The air inlet is configured to receive airflow such that the airflow is directed transversely across the interior space toward a portion of the side wall in a first direction. The airflow is redirected by the portion of the side wall across the interior space in a second direction that is positioned at an angle with respect to the first direction.

The side wall may be cylindrical. The air inlet may be configured so that the first direction is positioned at an angle with respect to an imaginary line that passes through a central axis of the side wall and a midpoint of the air inlet in a cross-sectional plane perpendicular to the central axis of the side wall and including the midpoint of the air inlet.

The side wall, the air inlet, and the air outlet may be configured so that the airflow that is redirected by the portion of the side wall flows in a generally cyclonic path to the air outlet.

The enclosure may have a floor that is positioned within the interior space and spaced above the bottom wall, the floor defining a plurality of openings. The air inlet may be positioned so that at least a portion of the airflow is directed between the floor and the bottom wall and at least a portion of the airflow is directed above the floor.

The enclosure may have a top wall that is positioned adjacent the top of the side wall, the top wall defining the air outlet. The top wall may have a solid portion that is positioned above at least a portion of the interior space.

The enclosure may include a barrier that is positioned within the interior space and spaced apart from the side wall. The enclosure may also include a baffle that is positioned within the interior space between the side wall and the barrier, the baffle movable between a blocking position, in which the baffle inhibits the airflow from flowing through the interior space between the barrier and the side wall, and an open position, in which the airflow may flow through the interior space between the barrier and the side wall.

The enclosure assembly may include an air source (e.g., a fan) that is coupled to the enclosure and configured to direct the airflow through the air inlet.

The side wall may define the air inlet, and the air inlet may be positioned adjacent the bottom wall.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

Figure 1:
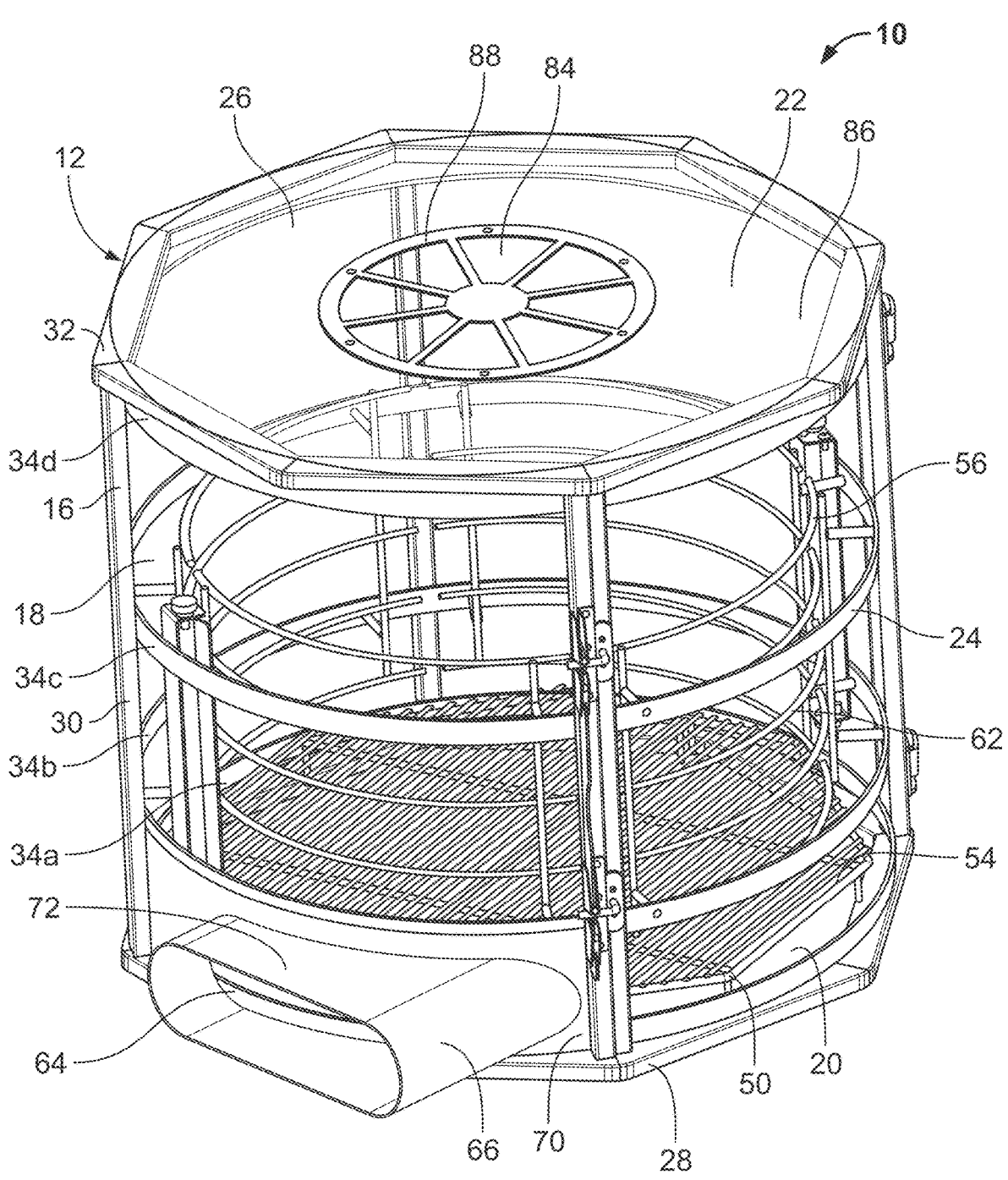
FIG. 1 is a perspective view of an animal enclosure assembly in accordance with an embodiment of the invention described herein.
Figure 12:
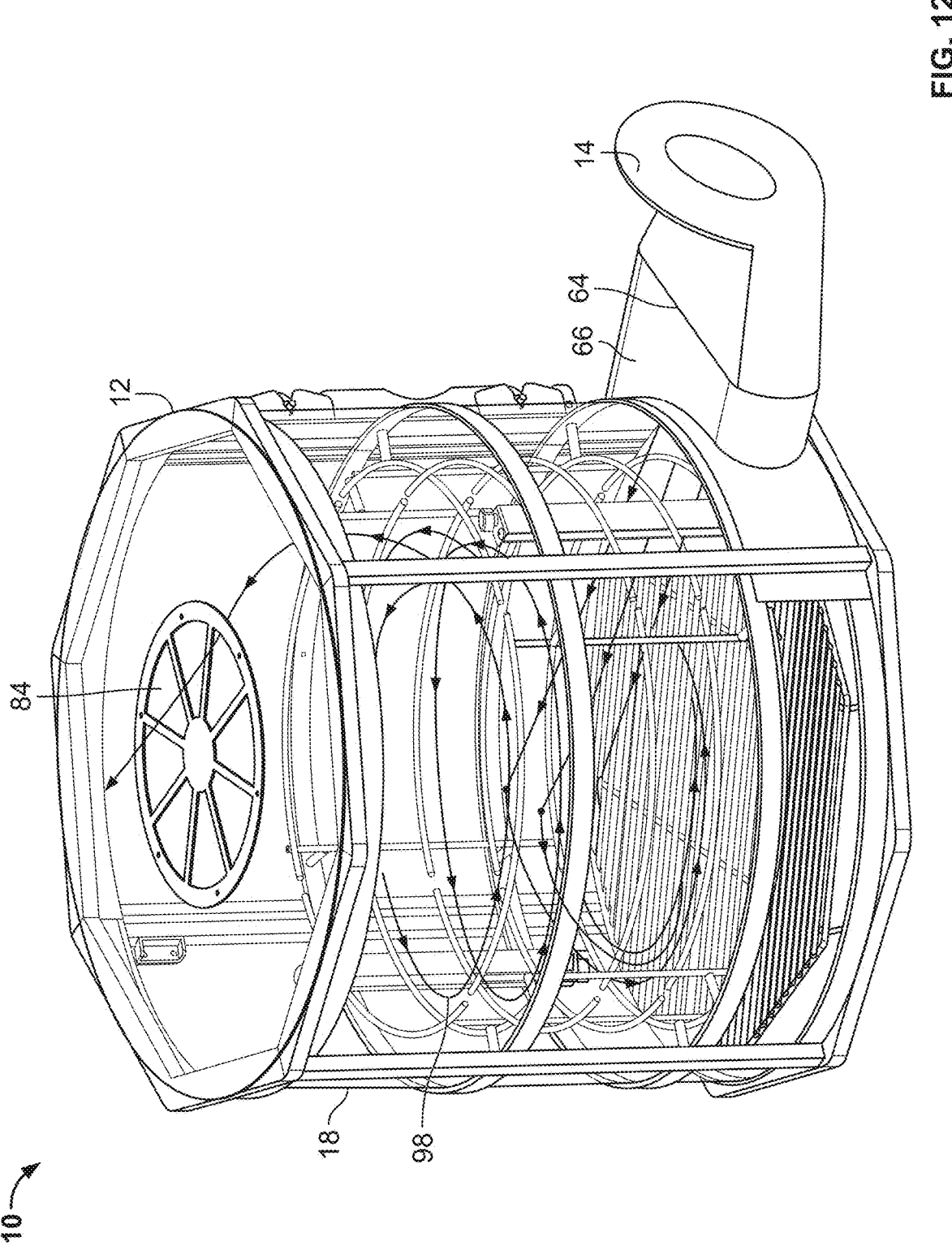
FIG. 12 is a perspective view of the animal enclosure assembly of FIG. 1, including a fan and showing the path of airflow from the fan through the animal enclosure.

An animal enclosure assembly for drying an animal is identified generally in FIG. 1 with the reference numeral 10. The animal enclosure assembly includes an enclosure 12 and a fan 14 (broadly, an air source), which is shown in FIG. 12. As described in more detail below, when the fan 14 is turned on, airflow from the fan 14 is directed into the enclosure 12 to dry an animal contained within the enclosure 12. The enclosure assembly 10 may be effective to dry an animal within the enclosure 12 without the use of heat. Further, the enclosure assembly 10 may be easy to use and clean, relatively low cost, low noise, and have a relatively small footprint.

Figure 2:
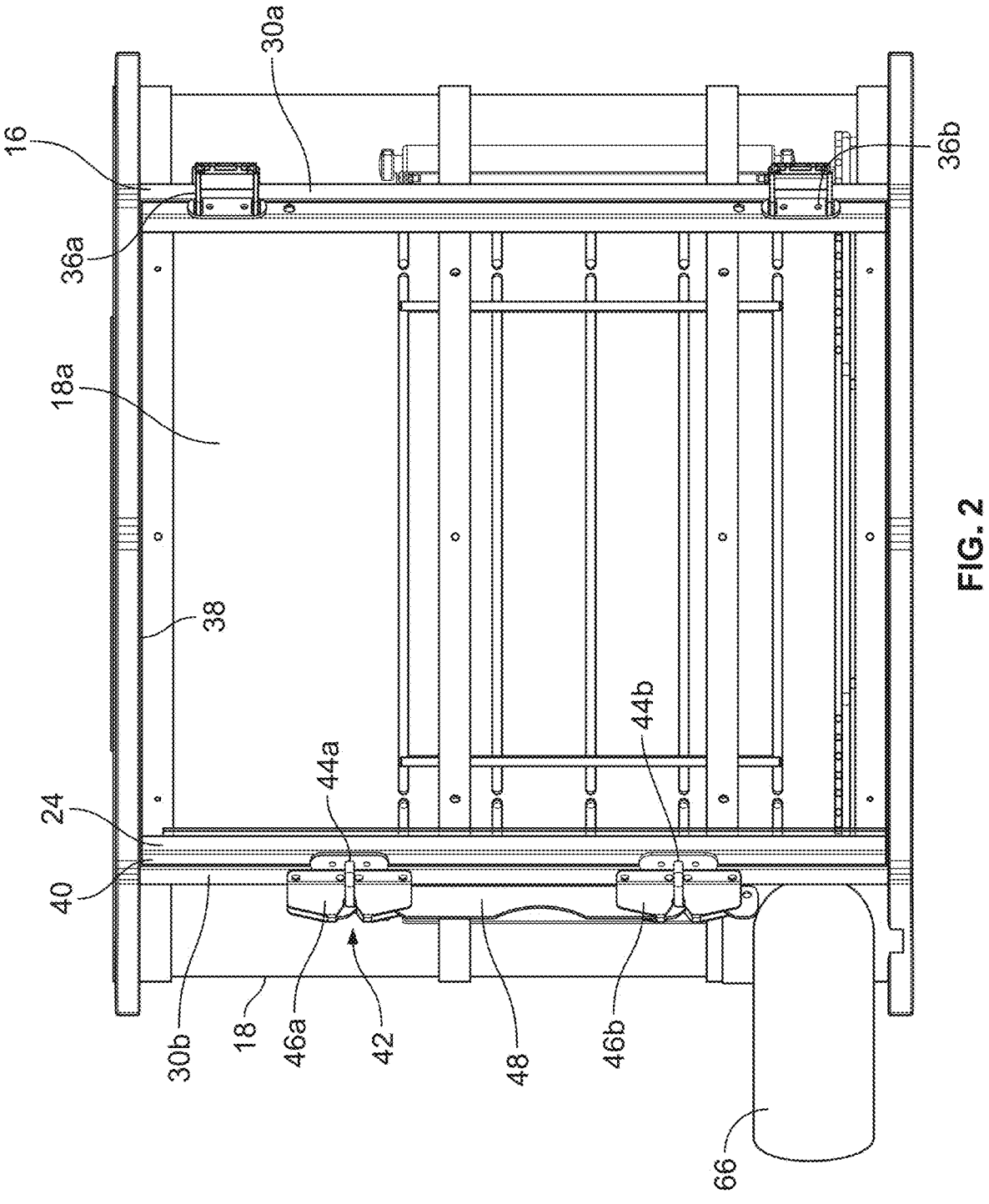
FIG. 2 is a front elevational view of the animal enclosure assembly of FIG. 1.

The enclosure 12 includes a frame 16, a side wall 18 and a bottom wall 20 that are each joined to the frame 16, a top wall 22 that is supported by a top of the frame 16, and a door 24 that is connected to the frame 16 with hinges 36a-b (FIG. 2). The side wall 18, bottom wall 20, top wall 22, and door 24 together define an interior space 26 that is sized and configured for containing an animal, such as a dog or a cat.

The frame 16 includes a base 28 that is joined to the bottom wall 20 and that supports the enclosure 12 on a surface, such as a floor or table. A plurality of generally vertical posts, one of which is identified in FIG. 1 as 30, are joined to the base 28 and extend upwardly from the base 28. Upper ends of the posts 30 are joined to a top 32 of the frame 16. The frame 16 further includes annular bands 34a-d that extend circumferentially around the side wall 18. The bands 34a-d are joined to the vertical posts 30 and are positioned between the posts 30 and the side wall 18 to retain the side wall 18 in place. The above-described components of the frame 16 and the bottom wall 20 may be made from any suitable material, including a metal, such as steel or aluminum. The components of the frame 16 may further be joined in any suitable manner, including by welding or by the use of fasteners.

The side wall 18 is transparent or semi-transparent allowing a user of the enclosure assembly 10 to view an animal positioned within the enclosure 12. The side wall 18 is cylindrical and extends from the base 28 to the top 32 of the frame 16. The side wall 18 may be made from a polymeric material such as polycarbonate. The side wall 18 may be shaped other than cylindrical as desired. For example, in cross-section, the side wall 18 may be polygonal.

Referring to FIG. 2, the door 24 is joined to a vertical post 30a with two hinges 36a-b that allow the door 24 to rotate to an open position (not shown), in which the interior space 26 is accessible by an animal through an opening 38 in the enclosure 12. FIG. 2 shows the door 24 in a closed position, in which the opening 38 is blocked by the door 24. The door 24 includes a portion 18a of the side wall 18 that is aligned with the remainder of the side wall 18 when the door is closed, as shown in FIG. 2, such that the side wall 18 is generally cylindrical when the door is closed. The door 24 further includes a frame 40 to which the side wall portion 18a is joined to retain it in place. A portion of each hinge 36a-b is joined to the frame 40 of the door 24, while another portion of each hinge 36*a-b* is joined to the vertical post 30*a*. On the side of the door 24 opposite the hinges 36*a-b*, a latch assembly 42 is operable to retain the door 24 in the closed position as desired. The latch assembly 42 includes latch pins 44*a-b* that are mounted to the frame 40 of the door 24 and corresponding latch guides 46*a-b* that are mounted to a vertical post 30*b* of the frame 16. When the door 24 is closed, the latch pins 44*a-b* are received within notches of the latch guides 46*a-b*. A latch bar 48 is movable with respect to the latch guides 46*a-b* between a latched position, in which the latch bar 48 retains the latch pins 44*a-b* within the latch guides 46*a-b*, and an unlatched position, in which the latch bar 48 permits the door 24 to be opened when the latch pins 44*a-b* are released from the latch guides 46*a-b*.

Figure 5:
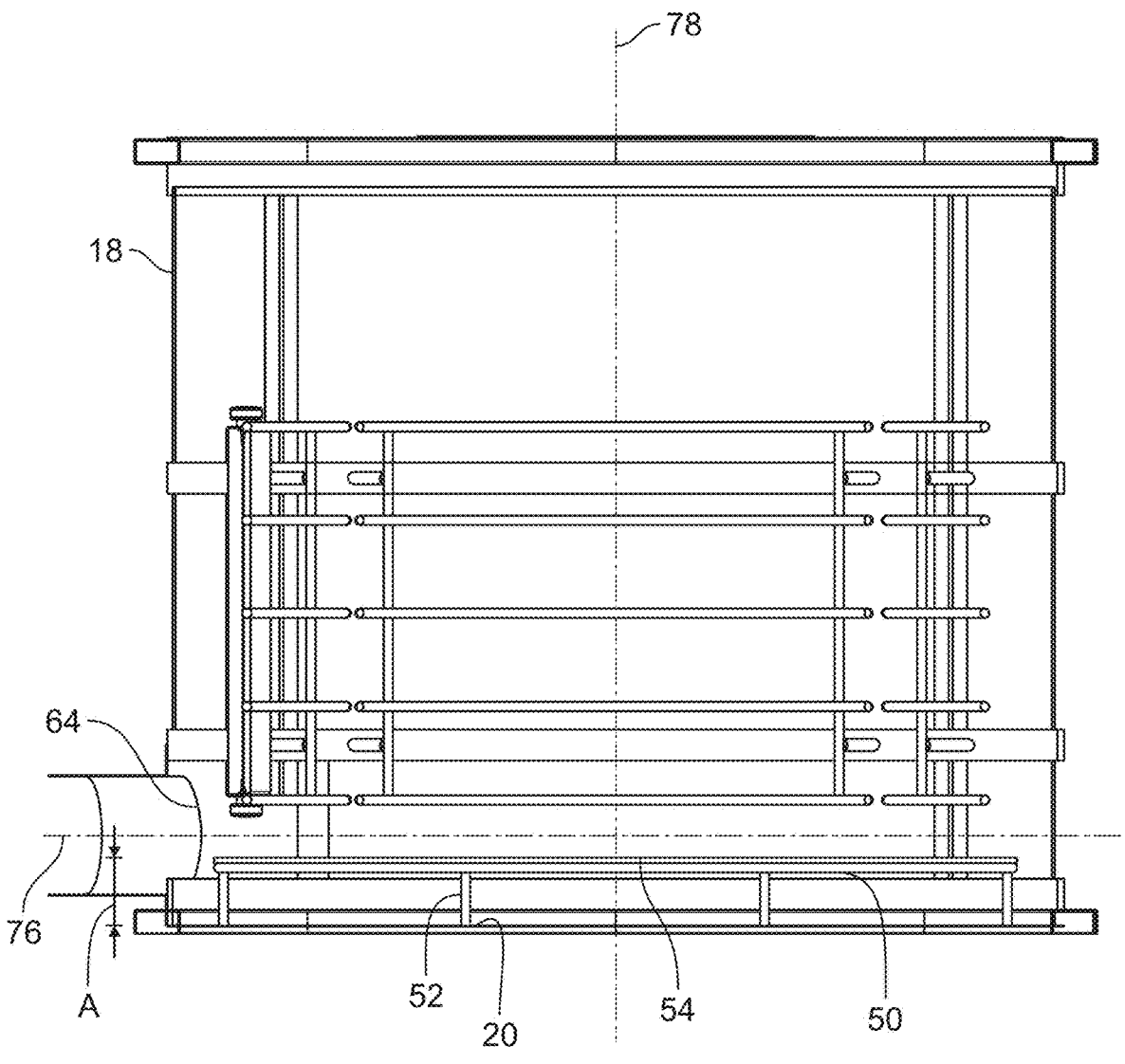
FIG. 5 is a cross-sectional view taken through the line 5-5 shown in FIG. 4.

A floor 50, shown in FIG. 1, is positioned within the interior space 26 and supported by the bottom wall 20. As shown in FIG. 5, the floor 50 includes a plurality of vertical supports, one of which is identified as 52, that are supported by the bottom wall 20. The floor 50 further includes an animal support surface 54 that is formed from a plurality of spaced apart bars. The supports 52 space the animal support surface 54 above the bottom wall 20 by a distance A, shown in FIG. 5. The animal support surface 54 is configured for supporting an animal within the interior space 26. The animal support surface 54 is formed from a plurality of spaced apart bars, as best shown in FIG. 1, such that there are a plurality of openings in the animal support surface 54 that allow airflow between the volumes of the interior space 26 above and below the animal support surface 54. If an animal is sitting on or laying down on the animal support surface 54, spacing the animal support surface 54 above the bottom wall 20 by the distance A allows airflow to reach the bottom of the animal to dry the animal, as described in more detail below.

A barrier 56, shown in FIG. 1, is positioned within the interior space 26 and joined to the frame 16. The barrier 56 includes a plurality of mounts, one of which is identified as 58 in FIG. 6, that are joined to the frame 16 and extend radially inward from the frame 16. The barrier 56 further includes a plurality of vertical bars, one of which is identified as 60, that extend between and are joined to vertically spaced apart mounts 58. A plurality of curved bars, one of which is identified as 62, extend between and are joined to circumferentially spaced apart vertical bars 60. The curved bars 62 are radially spaced apart from the side wall 18. As shown in FIG. 1, the curved bars 62 of the barrier 56 form a cylinder that is spaced radially inward from and concentric with the side wall 18. The curved bars 62 are vertically spaced apart from each other to define openings in the barrier 56 through which air may flow. The barrier 56 may restrict an animal within the interior space 26 from resting against the side wall 18 and preventing air from reaching portions of their fur that are in contact with the side wall 18.

Figure 3:
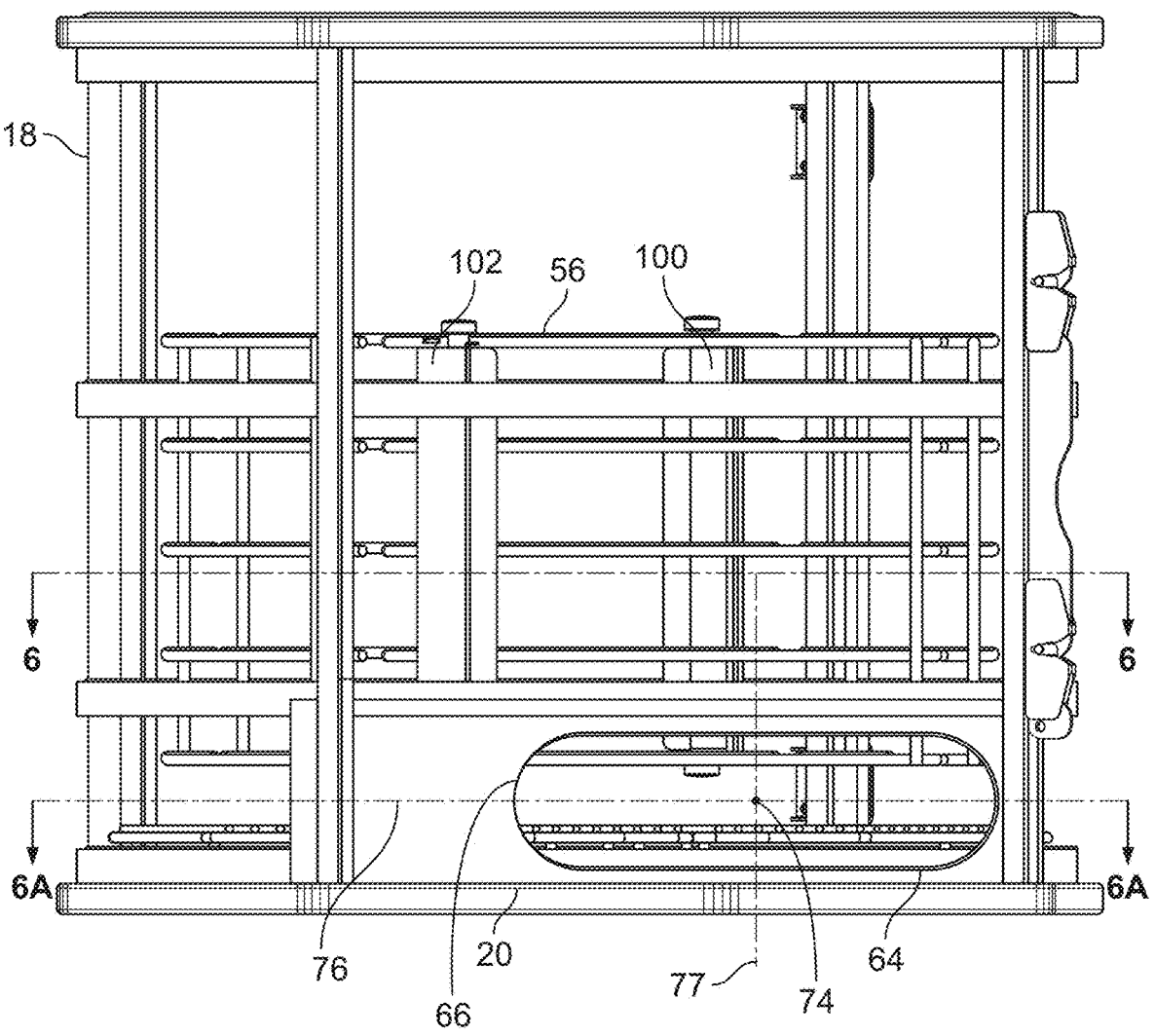
FIG. 3 is a side elevational view of the animal enclosure assembly of FIG. 1.

As shown in FIG. 3, an air inlet 64 is formed in a lower portion of the side wall 18 adjacent the bottom wall 20. The air inlet 64 is an opening allowing airflow from the fan 14 (FIG. 12) to enter the interior space 26 for drying an animal's wet coat or fur. The air inlet 64 is defined by a fan mount 66 that forms part of the side wall 18. As best shown in FIG. 1, the fan mount 66 includes a curved base 70 that is aligned with the cylindrical side wall 18 and a protrusion 72 that extends laterally outward from the curved base 70 away from the interior space 26. In cross-section, the protrusion 72, and the air inlet 64 that it defines, is generally shaped as a rectangle with rounded ends. The protrusion 72 is configured so that fan 14 (FIG. 12) may be mounted to or aligned with it for blowing air through the air inlet 64 into the interior space 26. While the air inlet 64 is shown in the drawings and described above as being positioned in the side wall 18, in some embodiments the air inlet 64 may be positioned in the bottom wall 20.

Figure 4:
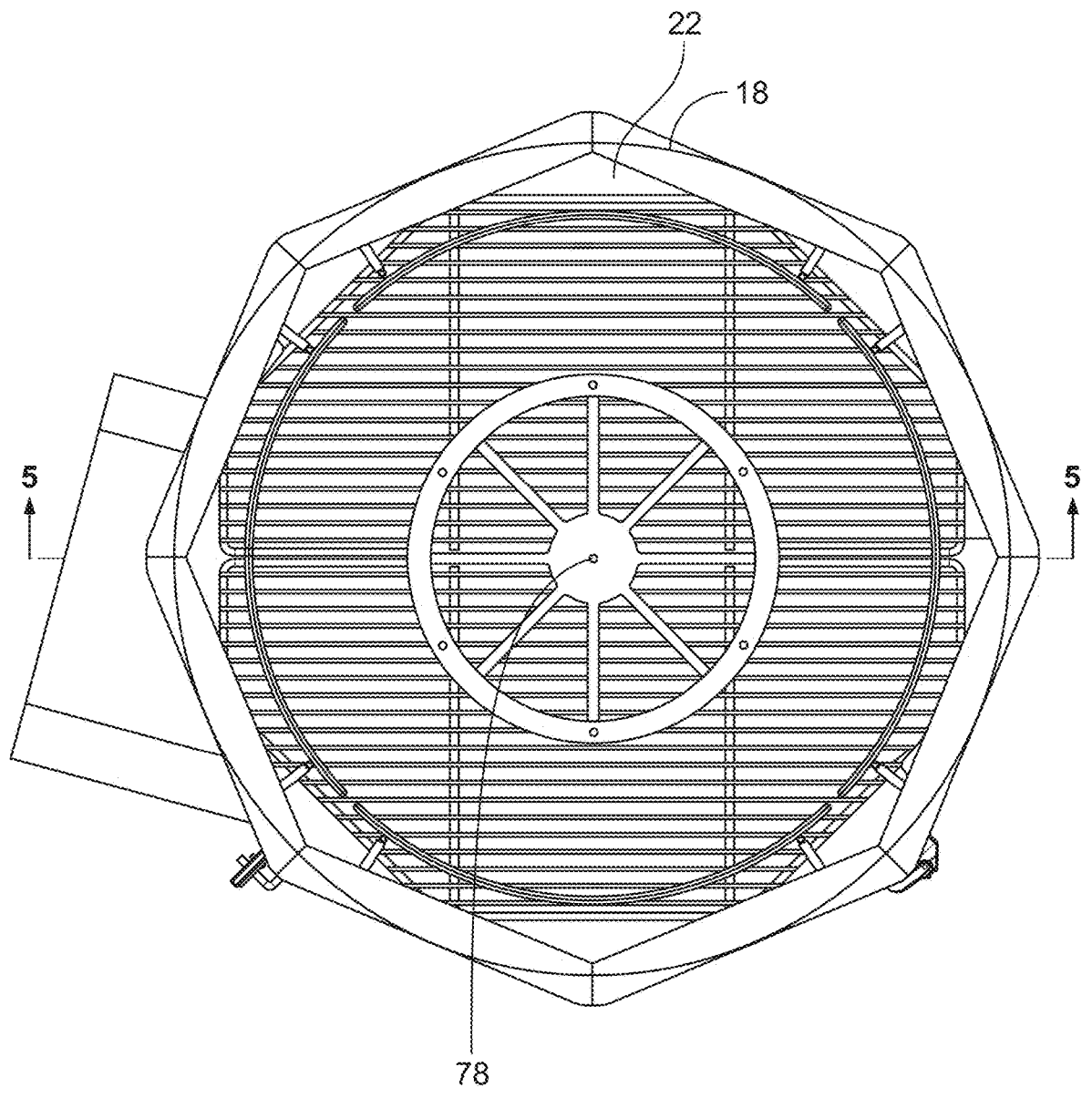
FIG. 4 is a top plan view of the animal enclosure assembly of FIG. 1.

Referring to FIG. 3, the air inlet 64 has a midpoint 74 that is positioned on the intersection of a horizontal plane 76 (shown in FIGS. 3 and 5) that vertically bisects the air inlet 64 into approximately equal portions above and below the horizontal plane 76 and a vertical plane 77 that horizontally bisects the air inlet 64 into approximately equal portions on either side of the vertical plane 77. Referring to FIGS. 4 and 5, the side wall 18 has a central axis 78. As shown in FIG. 6A, the fan mount 66 and the air inlet 64 are oriented to direct airflow from the fan 14 (FIG. 12) transversely across the interior space 26 toward a portion of the side wall 18 in a first direction 80. The first direction 80 is aligned with the direction in which the protrusion 72 of the fan mount 66 extends laterally outward from the curved base 70. Further, as shown in FIG. 6A, which is viewed in a cross-sectional plane that is perpendicular to the central axis 78 and that includes the midpoint 74 of the air inlet 64, the fan mount 66 and the air inlet 64 are configured so that the first direction 80 is positioned at an angle X with respect to an imaginary line 82 that passes through a central axis 78 of the side wall 18 and the midpoint 74 of the air inlet 64.

As shown in FIG. 5, the air inlet 64 is positioned so that at least a portion of the airflow directed through the air inlet 64 by the fan 14 (FIG. 12) is directed between the floor 50 and the bottom wall 20 and at least a portion of the airflow from the fan 14 is directed above the floor 50. Directing a portion of the airflow below the floor 50 may more effectively dry the bottom of an animal within the interior space 26, particularly when the animal is sitting on or laying down on the floor 50.

Referring to FIG. 1, the top wall 22 is positioned above and supported by the top 32 of the frame 16 adjacent the top of the side wall 18. The top wall 22 may alternatively be joined to the top 32 of the frame. The top wall 22 defines an air outlet 84. The top wall 22 further has a solid portion 86 that is positioned above and covers portions of the interior space 26. As shown, the solid portion 86 is generally annular surrounding the air outlet 84. The solid portion 86 may be formed from a transparent or semi-transparent material that is the same as the material from which the side wall 18 is formed. The air outlet 84 is shown in FIG. 1 as including a plurality of openings formed by a frame 88 positioned in the center of the top wall 22. The air inlet 64 is positioned below the air outlet 84. Including a top wall 22 that covers a portion of the interior space 26 with solid portion 86 may restrict airflow out of the interior space 26 to increase turbulent airflow within the interior space 26 when the fan 14 is operating. Turbulent airflow may increase contact between the airflow and the animal within the enclosure 12 to enhance drying of the animal's fur. The air outlet 84 may have other configurations or shapes than as shown in FIG. 1. Further, the top wall 22 is optional and the entire opening at the top of the side wall 18 may form the air outlet 84. In an alternative embodiment, the top wall 22 may be completely solid covering the interior space 26, and an air outlet may be formed in an upper portion of the side wall 18 above the air inlet 64.

The air inlet 64 is configured to receive airflow from the fan 14 (FIG. 12) such that the airflow is directed transversely across the interior space 26 toward a portion of the side wall 18 in the first direction 80. As shown in FIG. 6A, the portion of the side wall 18 that the airflow is directed toward is positioned between the lines 90 and 92, which are generally parallel to the first direction 80. If conditions generated by the fan 14 or within the enclosure 12 cause the airflow or portions of the airflow to be turbulent, portions of the airflow entering the enclosure 12 may be directed to other areas besides the space between the lines 90 and 92. Upon reaching the portion of the side wall 18 between the lines 90 and 92, the airflow is redirected by the portion of the side wall 18 across the interior space 26 in a second direction that is positioned at an angle with respect to the first direction 80. For example, portions of the airflow may be directed in a second direction 94, shown in FIG. 6A, that is positioned at an angle Y with respect to the first direction 80. Due to the curvature of the side wall between the lines 90 and 92, portions of the airflow may be redirected by the side wall 18 in different directions. For example, portions of the airflow may be redirected by the side wall 18 in a direction 96 that is positioned at an angle Z with respect to the first direction 80. As shown in FIG. 12, the side wall 18, the air inlet 64, and the air outlet 84 are configured so that the airflow entering the enclosure 12 through the air inlet 64 is redirected by the side wall 18 and flows in a generally cyclonic path 98 to the air outlet 84. The cyclonic path 98 of the airflow may be due to the curved cylindrical surface of the side wall 18, the relative positioning of the air inlet 64 with respect to the air outlet 84 (e.g., the vertical spacing between the air inlet 64 and the air outlet 84), and the orientation of the air inlet 64 with respect to the side wall 18 (e.g., orienting the air inlet 64 so that air entering the air inlet 64 is directed in a first direction 80 (FIG. 6A) that is at an angle X with respect to the imaginary line 82 that passes through the central axis 78 of the side wall 18 and the midpoint 74 of the air inlet 64). Conditions within the enclosure 12 may also cause the airflow entering the enclosure 12 from fan 14 to be turbulent to increase the drying effect of the airflow on an animal positioned within the enclosure 12. The side wall 18, bottom wall 20, and door 24 in combination may substantially prevent the airflow entering the air inlet 64 from fan 14 from leaking out of the enclosure 12 before exiting through the air outlet 84.

Figure 6:
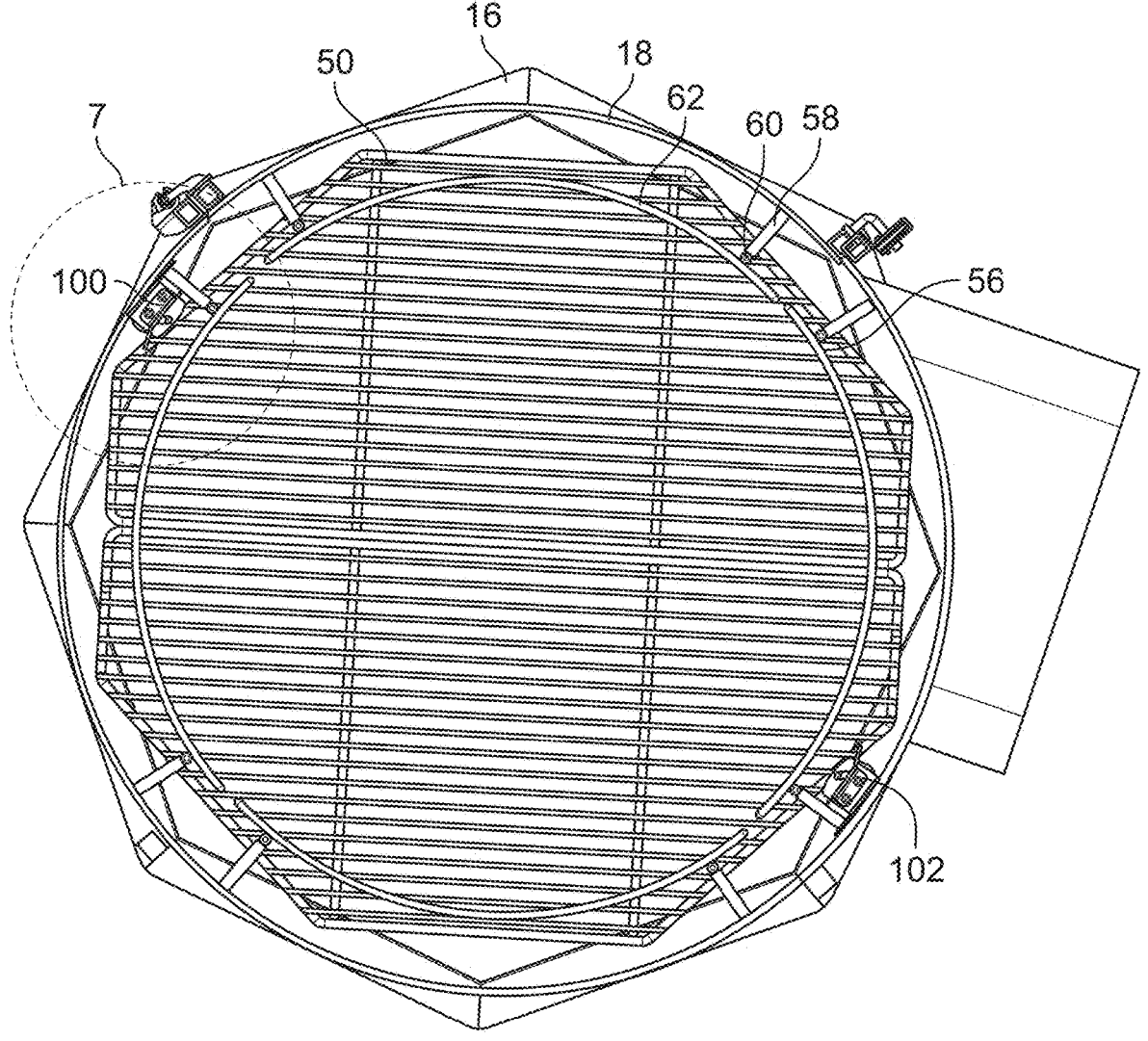
FIG. 6 is a cross-sectional view taken through the line 6-6 shown in FIG. 3.
Figure 6A:
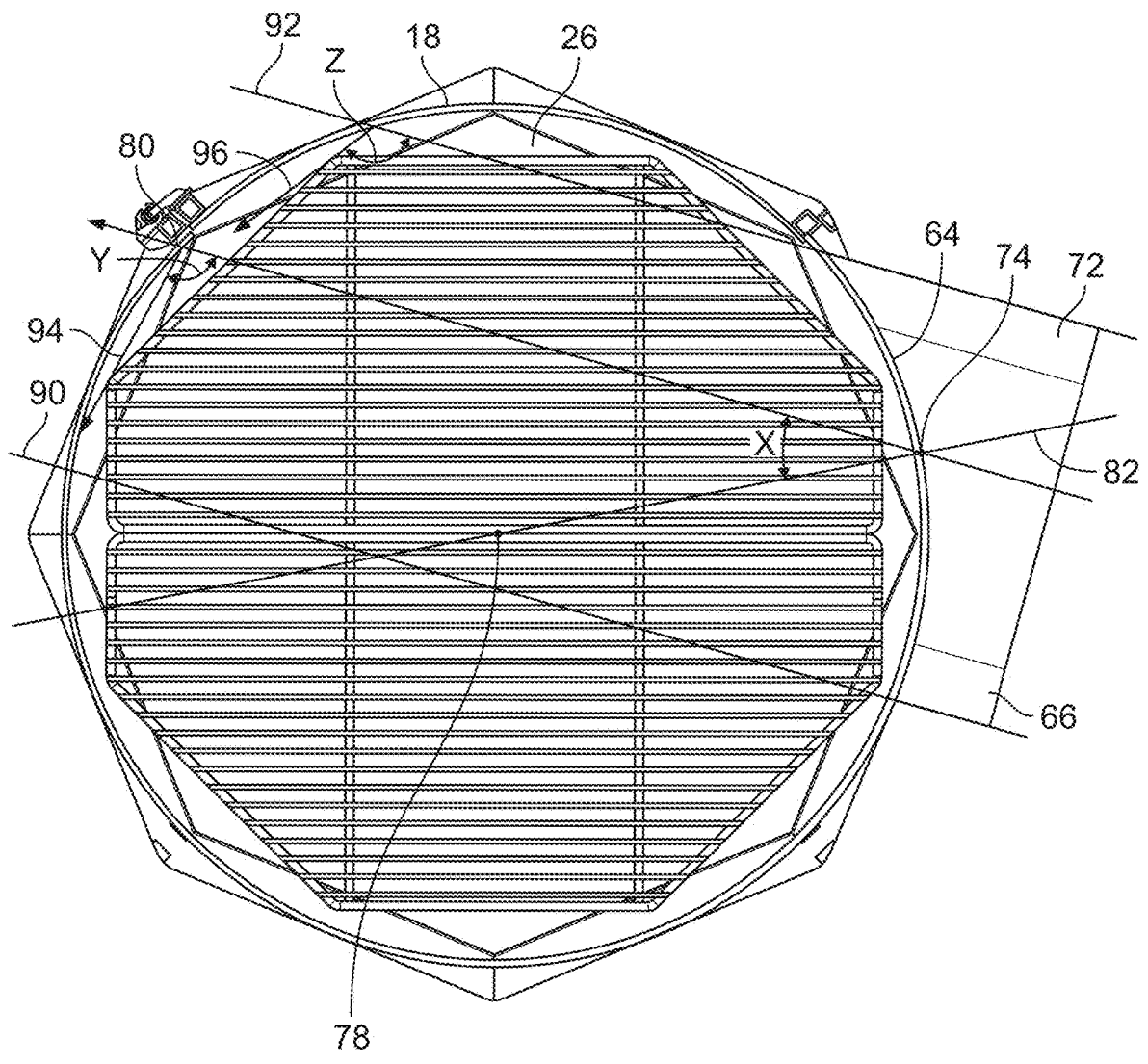
FIG. 6A is a cross-sectional view taken through the line 6A-6A shown in FIG. 3.

As shown in FIGS. 3 and 6, two baffle assemblies 100 and 102 are positioned within the interior space 26 between the barrier 56 and the side wall 18. The baffle assemblies 100 and 102 are circumferentially spaced from each other approximately half the circumference of the side wall 18. The baffle assemblies 100 and 102 are substantially similar to each other, and accordingly, only baffle assembly 100 is described in detail herein. The baffle assembly 100 includes a baffle 104 that is moveable between the open position shown in solid lines in FIG. 7 and the blocking position shown in dashed lines in FIG. 7. The baffle 104 is positioned within the interior space 26 between the side wall 18 and the barrier 56. In the blocking position, the baffle 104 inhibits the airflow from the fan 14 from flowing through the interior space 26 between the barrier 56 and the side wall 18. In the blocking position, the baffle 104 redirects airflow between the barrier 56 and the side wall 18 toward the center of the enclosure 12. In the open position, the airflow may flow through the interior space 26 between the barrier 56 and the side wall 18. The baffle 104 may be moved between the open position and the blocking position as desired to either focus the cyclonic airflow toward (when the baffle 104 is in the blocking position) or away from (when the baffle 104 is in the open position) the center of the enclosure 12.

Figure 7:
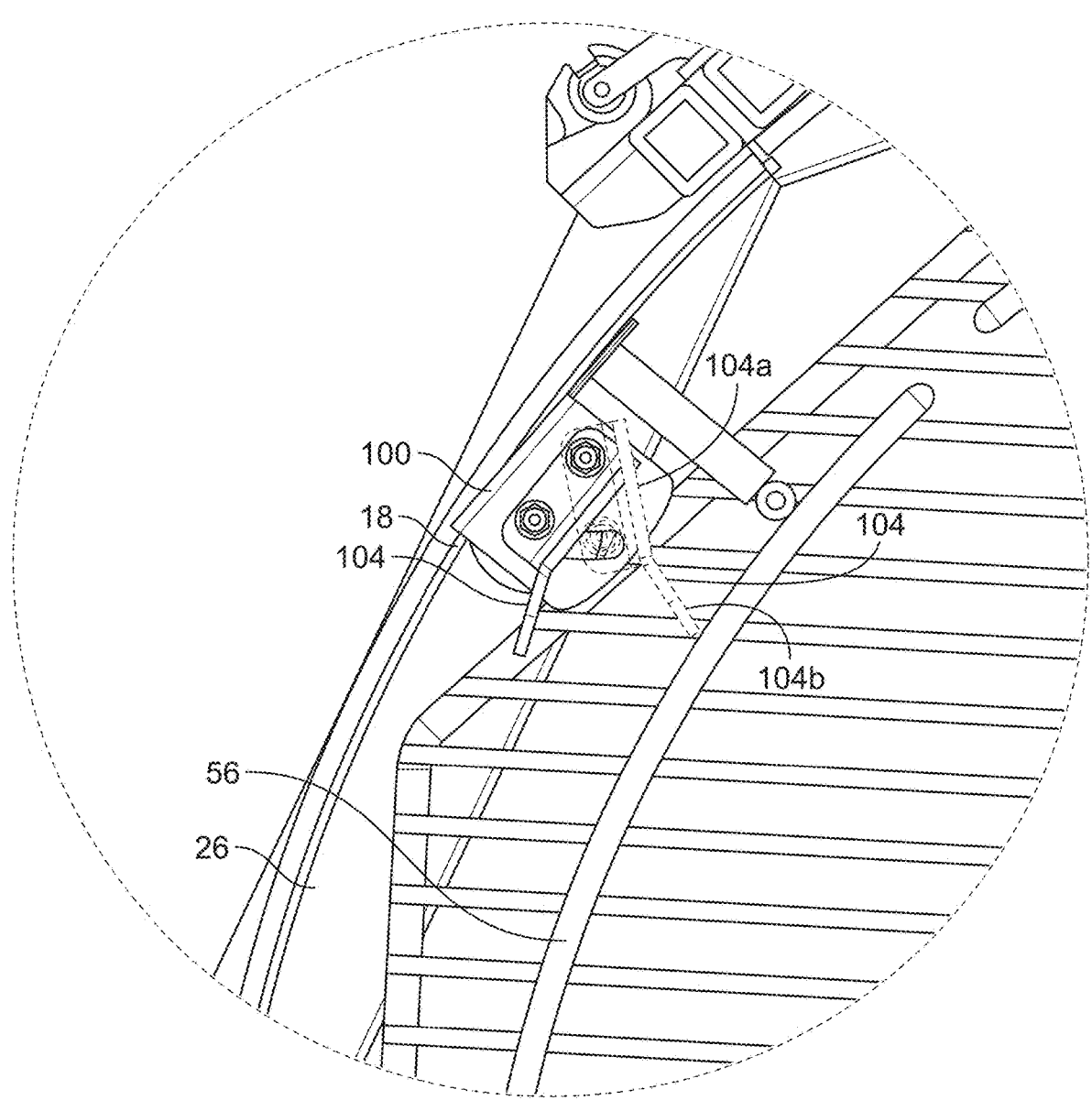
FIG. 7 is a detail view of the area 7 shown in FIG. 6.
Figure 8:
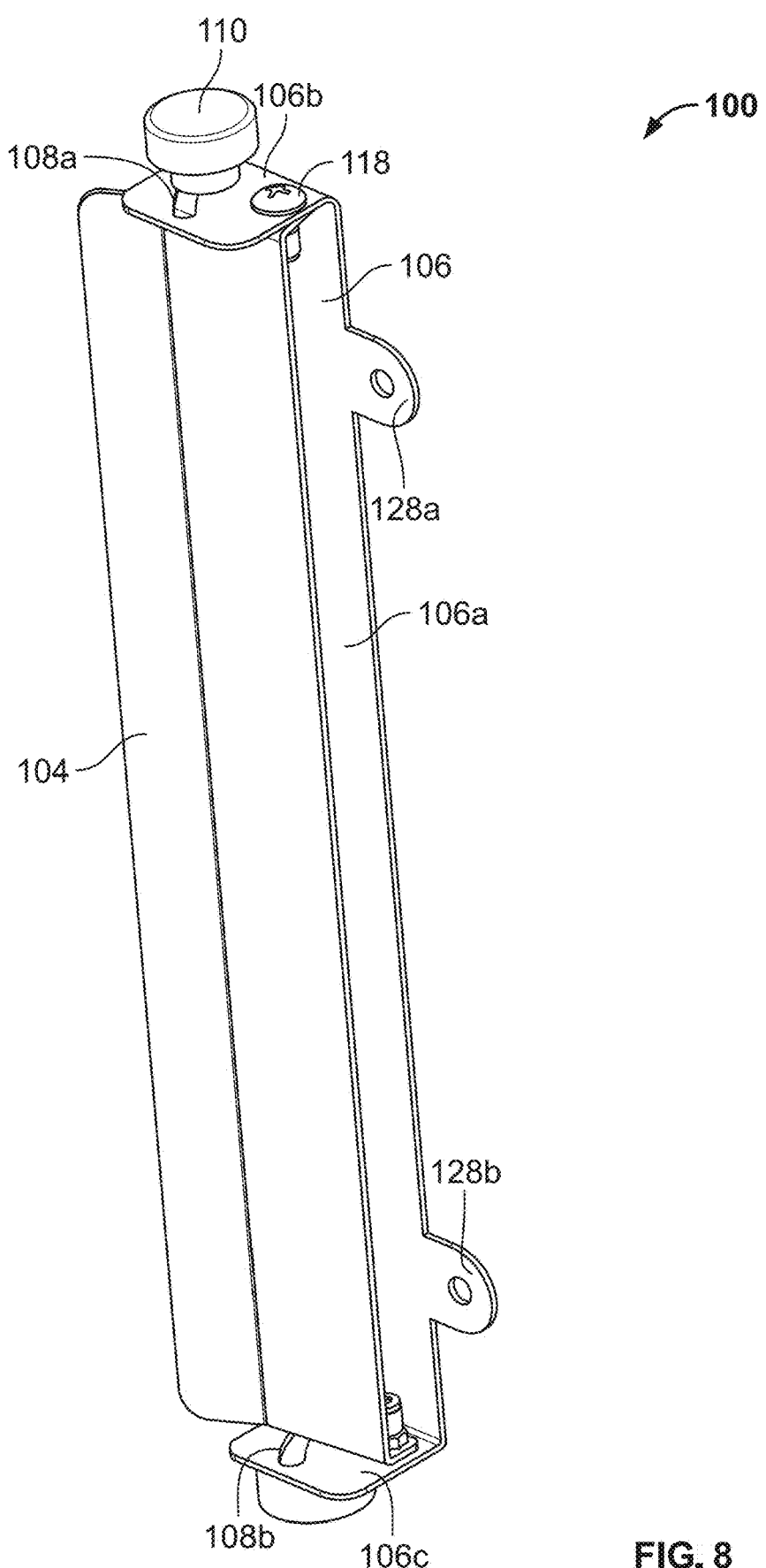
FIG. 8 is a perspective view of a baffle assembly of the animal enclosure assembly of FIG. 1.
Figure 9:
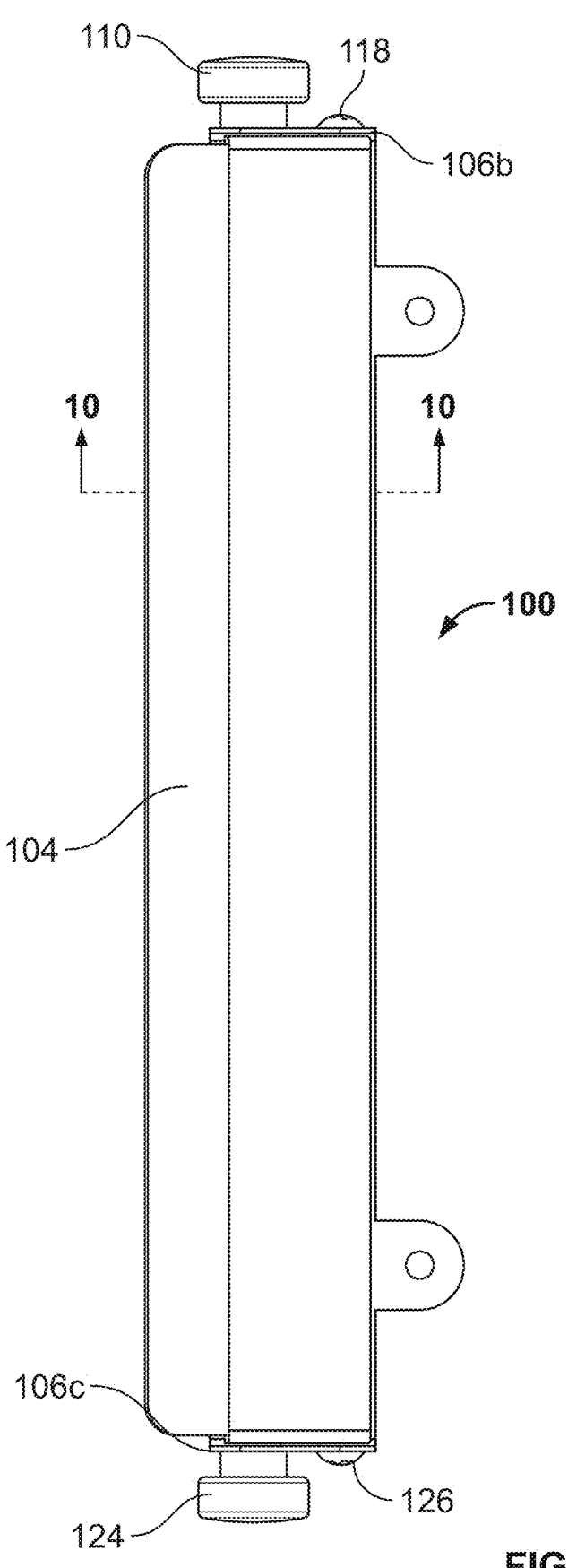
FIG. 9 is a front elevational view of the baffle assembly shown in FIG. 8.
Figure 10:
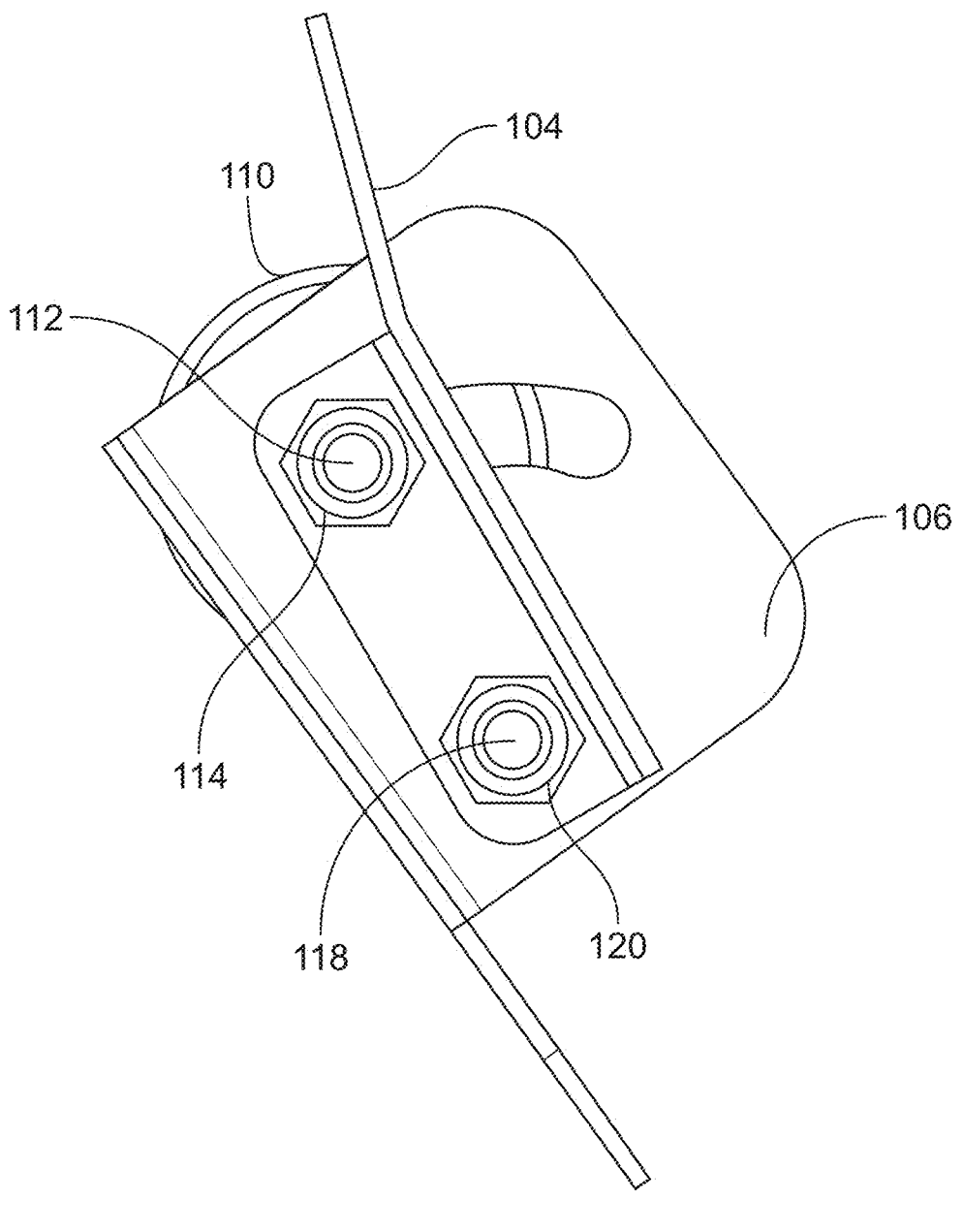
FIG. 10 is a cross-sectional view taken through the line 10-10 shown in FIG. 9.

Referring to FIG. 8, the baffle assembly 100 includes baffle 104 and a frame 106 that rotatably mounts the baffle 104 to the frame 16 of the enclosure 12. The frame 106 has a main wall 106a and top and bottom walls 106b-c that extend generally perpendicular from the main wall 106a. The baffle 104 is positioned between the top and bottom walls 106b-c and spaced from the main wall 106a. The top and bottom walls 106b-c have curved slots 108a-b. A knob 110 has a threaded shaft 112 (FIG. 10) extending from it that is received within the curved slot 108a. A nut 114, shown in FIG. 10, engages the threaded shaft 112. The nut 114 is received within a hexagonal opening 116, shown in FIG. 11, of the baffle 104. A screw 118, shown in FIG. 8, extends through an opening (not shown) in the top wall 106b. A nut 120, shown in FIG. 10, engages the screw 118. The nut 120 is received within a hexagonal opening 122, shown in FIG. 11, of the baffle 104. The knob 110 and screw 118 mount the top of baffle 104 to the top wall 106b. Another knob 124 and screw 126, shown in FIG. 9, mount the bottom of baffle 104 to the bottom wall 106c in a similar manner. The knobs 110 and 124 may be loosened to permit the baffle 104 to rotate between the open and blocking positions shown in FIG. 7. For example, when the knobs 110 and 124 are loosened, the threaded shaft 112 (FIG. 10) may move through the curved slot 108a between the open and blocking positions with the baffle 104 pivoting around the screws 118 and 126. The knobs 110 and 124 may be tightened to secure the baffle 104 in a fixed position relative to the frame 106. For example, once the baffle 104 is moved to the blocking position, one or both of the knobs 110 and 124 may be tightened to secure the baffle 104 in the blocking position. Tabs 128a-b (FIG. 8) extending outward from the main wall 106a of the frame 106 have openings that receive fasteners to mount the frame 106 to the frame 16 of the enclosure 12.

Figure 11:
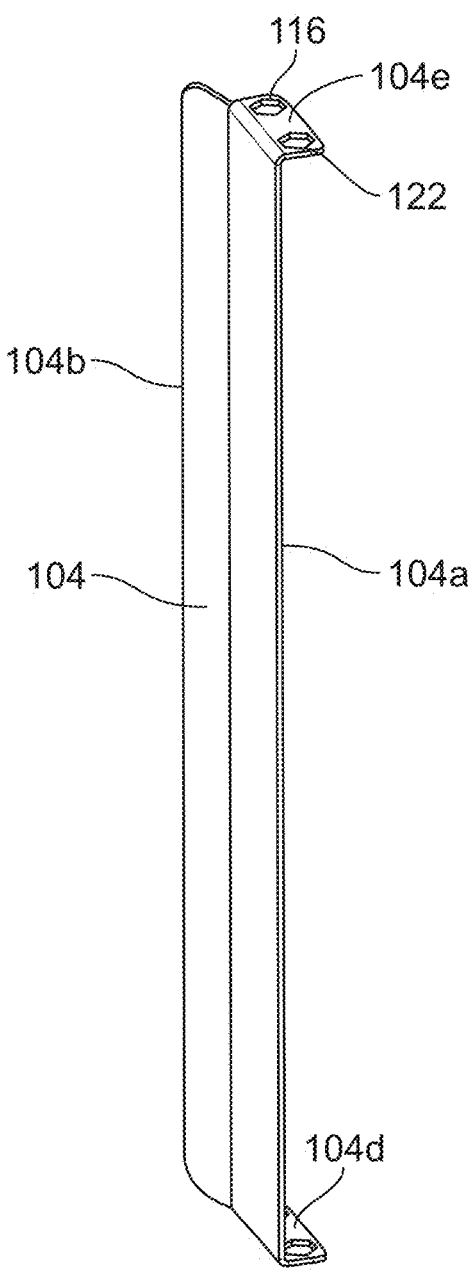
FIG. 11 is a perspective view of a baffle of the baffle assembly shown in FIG. 8.

Referring to FIG. 11, the baffle 104 has a main section 104a and an angled section 104b that extends outward at an oblique angle from the main section 104a. The main section 104a is positioned between the top and bottom walls 106b-c (FIG. 8) of the frame 106, and the angled section 104b extends outward from the frame 106, as shown in FIG. 7, to redirect the airflow within the enclosure 12 when the baffle 104 is in the blocking position. Tabs 104c-d extend generally perpendicular from the top and bottom of the main section 104a. The openings 116 and 122 are formed in tab 104c and similar openings are formed in tab 104d.

The fan 14, shown in FIG. 12, may be a conventional carpet dryer fan that is configured for mounting to the fan mount 66. For example, a portion of the fan 14 may be receivable within the fan mount 66. The fan mount 66 may be configured, however, so that other types of fans or air sources may be used with the enclosure 12 other than a carpet dryer fan.

In use, an operator opens the door 24, places a wet animal within the enclosure 12, and shuts the door 24. The baffle assemblies 100 and 102 are moved to the desired open or blocking position, or any position between the open and blocking positions. The fan 14 is mounted on the fan mount 66 and turned on for a desired length of time. Airflow from the fan 14 dries the animal's wet coat, in the manner described above. When the animal is sufficiently dry, the fan 14 is turned off, and the animal is removed from the enclosure 12 through the door 24.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. An animal enclosure assembly for drying an animal, the assembly comprising:

an enclosure comprising at least one side wall and a bottom wall coupled to the side wall, the bottom wall and the side wall defining an interior space for containing an animal, the enclosure defining an air outlet that is positioned adjacent a top of the side wall, and an air inlet positioned below the air outlet and configured to receive airflow such that the airflow is directed transversely across the interior space toward a portion of the side wall in a first direction, and the airflow is redirected by the portion of the side wall across the interior space in a second direction that is positioned at an angle with respect to the first direction, wherein the enclosure further comprises a barrier that is positioned within the interior space and spaced apart from the side wall, wherein the enclosure further comprises a baffle that is positioned within the interior space between the side wall and the barrier, the baffle movable between a blocking position, in which the baffle inhibits the airflow from flowing through the interior space between the barrier and the side wall, and an open position, in which the airflow may flow through the interior space between the barrier and the side wall.

2. The animal enclosure assembly of claim 1, wherein the portion of the side wall is curved.

3. The animal enclosure assembly of claim 1, wherein the side wall is cylindrical.

4. The animal enclosure assembly of claim 3, wherein the air inlet is configured so that the first direction is positioned at an angle with respect to an imaginary line that passes through a central axis of the side wall and a midpoint of the air inlet in a cross-sectional plane perpendicular to the central axis of the side wall and including the midpoint of the air inlet.

5. The animal enclosure assembly of claim 1, wherein the side wall, the air inlet, and the air outlet are configured so that the airflow that is redirected by the portion of the side wall flows in a generally cyclonic path to the air outlet.

6. The animal enclosure assembly of claim 1, wherein the enclosure further comprises a floor that is positioned within the interior space and spaced above the bottom wall, the floor defining a plurality of openings.

7. The animal enclosure assembly of claim 6, wherein the air inlet is positioned so that at least a portion of the airflow is directed between the floor and the bottom wall and at least a portion of the airflow is directed above the floor.

8. The animal enclosure assembly of claim 1, the enclosure further comprising a top wall that is positioned adjacent the top of the side wall, the top wall defining the air outlet.

9. The animal enclosure assembly of claim 8, wherein the top wall comprises a solid portion that is positioned above at least a portion of the interior space.

10. The animal enclosure assembly of claim 1, wherein the enclosure further comprises a door that is movable between an open position, in which an animal may pass through an opening in the enclosure to access the interior space, and a closed position, in which the opening is blocked by the door.

11. The animal enclosure assembly of claim 1, further comprising an air source that is coupled to the enclosure and configured to direct the airflow through the air inlet.

12. The animal enclosure assembly of claim 1, wherein the side wall defines the air inlet, and the air inlet is positioned adjacent the bottom wall.

13. An animal enclosure assembly for drying an animal, the assembly comprising:

an enclosure comprising a cylindrical side wall and a bottom wall coupled to the side wall, the bottom wall and the side wall defining an interior space for containing an animal, wherein the side wall defines an air inlet that is positioned adjacent the bottom wall, wherein the enclosure defines an air outlet that is positioned adjacent a top of the side wall, and wherein the air inlet is configured to receive airflow such that the airflow is directed transversely across the interior space toward a portion of the side wall in a first direction, and the airflow is redirected by the portion of the side wall across the interior space in a second direction that is positioned at an angle with respect to the first direction, wherein the air inlet is further configured so that the first direction is positioned at an angle with respect to an imaginary line that passes through a central axis of the side wall and a midpoint of the air inlet in a cross-sectional plane perpendicular to the central axis of the side wall and including the midpoint of the air inlet, wherein the enclosure further comprises a barrier that is positioned within the interior space and spaced apart from the side wall, wherein the enclosure further comprises a baffle that is positioned within the interior space between the side wall and the barrier, the baffle movable between a blocking position, in which the baffle inhibits the airflow from flowing through the interior space between the barrier and the side wall, and an open position, in which the airflow may flow through the interior space between the barrier and the side wall.

14. The animal enclosure assembly of claim 13, wherein the side wall, the air inlet, and the air outlet are configured so that the airflow that is redirected by the portion of the side wall flows in a generally cyclonic path to the air outlet.

15. The animal enclosure assembly of claim 13, wherein the enclosure further comprises a floor that is positioned within the interior space and spaced above the bottom wall, the floor defining a plurality of openings, wherein the air inlet is positioned so that at least a portion of the airflow is directed between the floor and the bottom wall and at least a portion of the airflow is directed above the floor.

16. The animal enclosure assembly of claim 13, the enclosure further comprising a top wall that is positioned adjacent the top of the side wall, the top wall defining the air outlet, wherein the top wall comprises a solid portion that is positioned above at least a portion of the interior space.

17. The animal enclosure assembly of claim 13, further comprising an air source that is coupled to the enclosure and configured to direct the airflow through the air inlet.

* * * * *